Aug. 10, 1965

G. E. ZENZEFILIS 3,200,263

NRZ SIGNAL DETECTOR

Filed April 26, 1962

INVENTOR.
GEORGE E. ZENZEFILIS
BY
Douglas M. Clarkson
ATTORNEY

INVENTOR.
GEORGE E. ZENZEFILIS
BY
ATTORNEY

United States Patent Office 3,200,263
Patented Aug. 10, 1965

3,200,263
NRZ SIGNAL DETECTOR
George E. Zenzefilis, Huntington, N.Y., assignor to Potter Instrument Company, Inc., Plainview, N.Y., a corporation of New York
Filed Apr. 26, 1962, Ser. No. 190,496
6 Claims. (Cl. 307—88.5)

The present invention, generally, relates to an electrical circuit to detect a "Null-Represents-Zero" (NRZ) signal that traverses a magnetostrictive delay line and, more particularly, to a circuit to convert NRZ signals to a different form for utilization.

Past difficulties arose because a magnetostrictive delay line operating in the NRZ mode has an output of voltage doublets in series, each doublet representing a "ONE" and each reversed in polarity from the previous one. The doublets half merge when the line operates at maximum rated frequency; that is, the trailing lobe of every doublet merges completely with the leading lobe of the next doublet for a succession of "one's."

The task, therefore, of detecting the information emerging from such a delay line involves detecting the moment that the voltage waveform crosses the zero axis with a relatively large slope. This has been a difficult task to perform in the past, and accordingly, it is a principal object of this invention to provide a practical means to detect an NRZ signal that traverses a magnetostrictive delay line.

It also is an object of the invention to provide an electrical circuit to transform the usual output voltage waveform from a magnetostrictive delay line which is operating in the NRZ mode to a form more convenient for detecting.

Another object of the invention is to provide a new and improved electrical circuit to detect specifically designated waveform data.

Still another object of the invention is to provide circuit means to convert doublet voltages into unidirectional pulses of substantially constant amplitude.

A further object of the invention is to convert merging voltage doublet signals having different amplitude characteristics into unidirectional pulses of substantially constant amplitude.

A still further object of the invention is to provide a circuit to treat NRZ signals, modified NRZ signals and the like which have passed over a magnetostrictive delay line so that they are compatible with signals which have not passed over such a line.

According to the broad aspect of the present invention, therefore, signals derived from magnetostrictive delay lines, when such lines are excited with NRZ and modified NRZ signals, are operated upon in such a way as to make them more readily usable and to make them compatible with such signals recovered from magnetic tape recordings and the like. More specifically, the invention provides means to integrate signals which are derived from magnetostrictive delay lines and the like and to perform certain rectification and inversion functions so as to produce the desired compatible and readily usable signals.

In accordance with a preferred form of the present invention, an electrical circuit means is provided to integrate signals recovered from a delay line and, then, to invert the integrated signals. Means is provided also to add together the integrated and inverted signals, and a full wave rectifier means converts these latter signals to the desired compatible output signals.

The output signals provided by a circuit arranged in accordance with the principles of the invention will be found to be of the same general form as signals derived from tape recordings and of the general form which may be most readily utilized in digital computer circuits and systems. These signals are especially desirable where peak detection is utilized later on in the system for reading the signals.

These and other objects and advantages of the present invention will be apparent from the following detailed description of a preferred form of the invention taken in conjunction with the accompanying drawings, in which.

Figure 2:
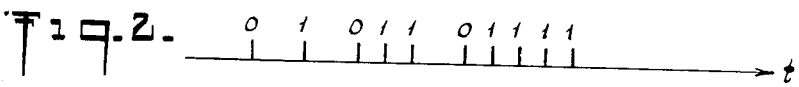
FIG. 2 illustrates a code for the purpose of aiding in the description of the invention.
Figure 3:
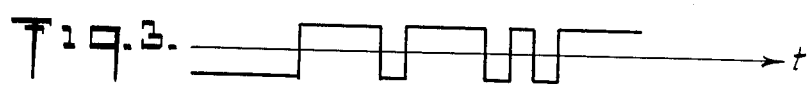
FIG. 3 is a curve showing an NRZ voltage wave train for the code of FIG. 2 illustrating that a change in voltage (increase or decrease) represents a binary "one" and a null (no change) represents a binary "zero"

Referring now to FIGS. 2 and 3 of the drawings, information signals from any suitable source (not shown) are in a code form represented by the sequence 0 1 0 1 1 0 1 1 1 and this code sequence is represented by the NRZ signals illustrated typically in FIG. 3. A binary "one" is represented by each change in voltage magnitude, and a binary "zero" is represented by no change in voltage.

The signals of FIG. 3 are typical of the input to a suitable magnetostrictive line driver which may include such components as a transistorized flip-flop circuit and a current driver circuit.

A magnetostrictive delay line propagates signals which, when picked up by an output coil, are in the form of voltage doublets corresponding to abrupt changes in the input current signal. Thus, the signal form shown in FIG. 3 will traverse a magnetostrictive delay line in such a manner that for each "1," a voltage doublet will be developed across the output coil.

Figure 1:
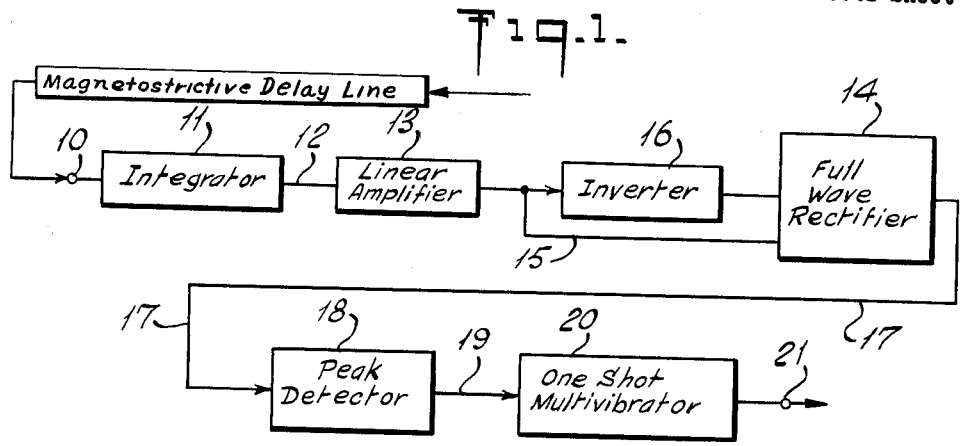
FIG. 1 is a schematic circuit diagram in accordance with the principles of the present invention.

When the delay line is operated at or near its upper response rate limit, the form of the signal output, which is the input to the circuit shown in FIG. 1, will be characterized by the amplitude of some signals being double that of others due to a merging of the signal doublets where there are adjacent "one's."

It has been found to be extremely difficult to "read" such signals as mentioned above. Therefore, the circuit of the invention, as shown in FIG. 1, receives the output of a magnetostrictive delay line to provide uniform amplitude unidirection signals which are readable readily by peak detection devices.

Referring now to FIG. 1 of the drawings, an input terminal 10 receives signals from a magnetostrictive delay line (not shown) and connects these signals to an integrator circuit 11. Suitable connection means include a lead 12 to couple the output from the integrator circuit 11 to a linear amplifier 13.

Figure 4:
FIG. 4 shows the voltage output for the integrator portion of the circuit shown in FIG. 1.

The curve shown in FIG. 4 of the drawings illustrates the form of the signal at the lead 12.

From the amplifier 13, the signal is connected to a full wave rectifier 14 over a lead 15, and the same signal passes through an inverter circuit 16 for connection also to the full wave rectifier 14. The output of the full wave rectifier 14 appears as illustrated by the wave form shown in FIG. 5 of the drawings.

Figure 5:
FIG. 5 shows the voltage output for the full wave rectifier portion of the circuit shown in FIG. 1.

The output of the full wave rectifier 14 is connected over a lead 17 to a suitable peak detector circuit 18 adapted to provide an output over a lead 19 to trigger a one-shot multivibrator circuit 20 each time a peak in the wave form shown in FIG. 5 is detected. The output of the multivibrator circuit 20 includes a suitable terminal 21 by which the signal output may be extracted for any useful purpose.

Figure 6:
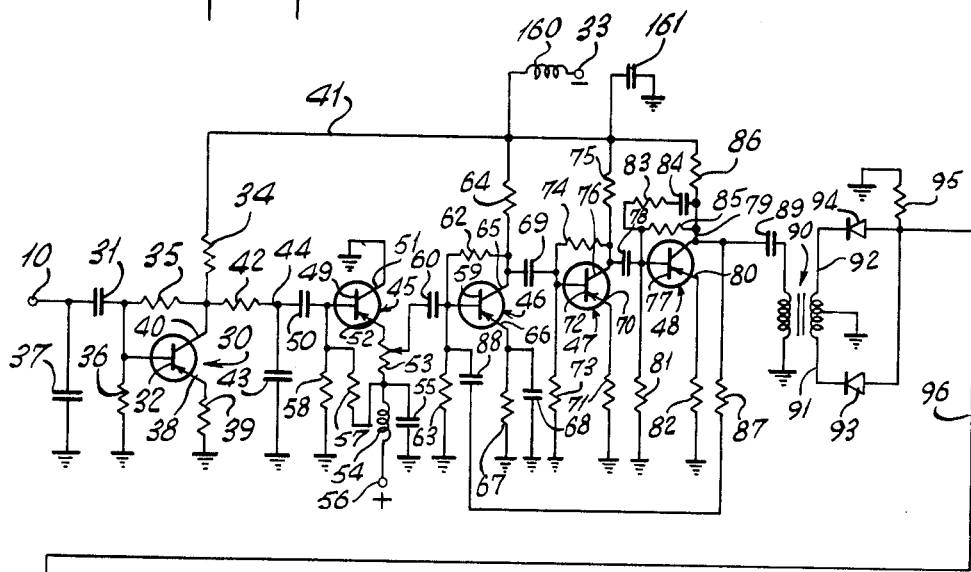
FIG. 6 is a circuit diagram showing details for the arrangement illustrated in FIG. 1.
Figure 6:
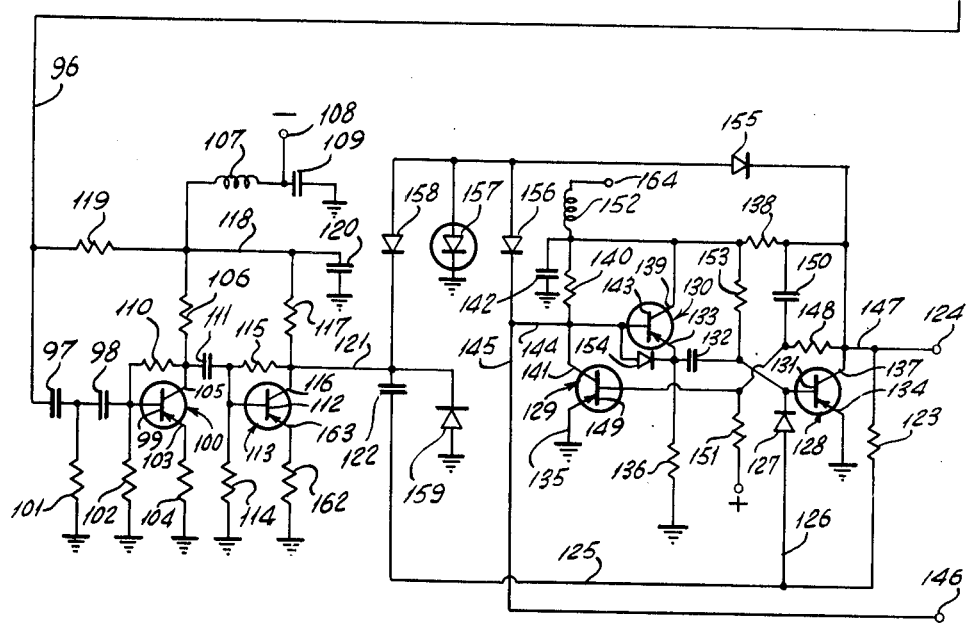

For illustrative purposes, a more detailed circuit is shown in FIG. 6 of the drawings, wherein a transistor 30 amplifies signals received at its base terminal 32 through a coupling capacitor 31 from a delay line connected at the terminal 10. The base terminal 32 receives a bias voltage from a suitable source, indicated at the terminal 33, as divided by resistors 34, 35 and 36. A capacitor 37 is connected to the input terminal 10 as a tuning capacitor.

An emitter terminal 38 is connected directly to ground through a resistor 39, and a collector terminal 40 is connected also to the bias voltage source 33 over a lead 41 and through a resistor 34.

This transistor stage 30 operates in the class A mode with a common emitter configuration. The collector resistor 34 acts as the D.-C. load, the emitter resistor 39 produces a negative voltage feed back and the two base resistors 35 and 36 generate the proper bias conditions and also act as quiescent state stabilizers. Capacitor 31 serves also act as the coupling link. Capacitor 37 serves as a tuner to compensate slight bandwidth shifts in individual delay lines. Terminals 38, 32 and 40 are respectively the emitter, base and collector of transistor 30.

The amplified signals across the resistor 34 are integrated by suitable means, such as a resistor 42 connected in series with a capacitor 43 between the collector 40 and ground, so that integrated signals of the form shown in the voltage curve of FIG. 4 appear at the junction 44.

It will be understood that the integration restores the signals to a substantially constant amplitude.

A transistor 45 including the above circuit components functions as an emitter follower to couple the integrated signals for amplification by transistorized amplifier stages which embody transistors 46, 47 and 48. The integrated signals are connected to the base terminal 49 of the transistor 45 through a coupling capacitor 50. The collector terminal 51 is connected directly to ground, and the emitter terminal 52 through a resistor 53 (which is adjustable) is connected to a filter network composed of a choke 54 and a capacitor 55.

The positive terminal of a bias voltage source (not shown) is connected to a terminal 56, and the magnitude of the voltage applied to the base terminal 49 of the transistor 45 is determined by the voltage divider resistors 57 and 58. It will be evident now that the transistor 45 which, together with its associated circuitry, functions as an emitter follower couples the integrator circuit 11, FIG. 1, to the amplifier circuit 13. It will be evident also that the transistor 45 provides no gain and performs 100% negative feed back.

From the transistor 45, the signal is connected from the variable contact of the resistor 53 to a base terminal 59 through a coupling capacitor 60, and a collector terminal 65 developes a bias voltage at the base terminal 59 across the resistor 62 and 63 and is loaded by a resistor 64. The emitter terminal 66 is connected to ground through a resistor 67 shunted by a capacitor 68, and the output of the transistor 46 is coupled to the transistor 47 by a coupling capacitor 69.

Transistor 46 operates in the class A mode with a common emitter configuration. The collector resistor 67 acts as the D.-C. load, the emitter resistor 67 produces a negative voltage feed back, and the two base resistors 62 and 63 generate the proper bias conditions and also act as quiescent state stabilizers. Capacitor 68 serves as a high frequency peaking element in order to enhance the gain at the higher end of the bandwidth.

The second stage of amplification in accordance with the preferred form of the invention utilizes a transistor 47 operating in a class A mode with a common emitter configuration. An emitter terminal 70 is connected directly to ground through a resistor 71, and a base terminal 72 is connected to ground through a resistor 73 and to the collector terminal 76 through resistor 74. A collector terminal 76 is connected to a voltage at the terminal 33 through a resistor 75.

The collector resistor 75 acts as the D.-C. load, the emitter resistor 71 produces a negative voltage feed back, and the two base resistors 74 and 73 generate the proper bias conditions and also act as quiescent state stabilizers.

The amplified integrated signals developed at the collector terminal 76 are applied to the base terminal 77 of the transistor 48, which operates similar to the transistor 47, through a coupling capacitor 78, and the output signals from the third amplifier stage appears at the collector terminal 79. The base terminal 77 and the emitter terminal 80 are both connected to ground through resistors 81 and 82, respectively, the collector terminal 79 being connected to the voltage source at terminal 33 by a resistor 86. The collector terminal 79 is connected to the base terminal 77 by one branch composed by resistor 85 and also by another branch composed by resistor 83 and capacitor 84.

The collector resistance 86 acts as the D.-C. load, the emitter resistor 82 produces a negative voltage feed back, and the two base resistors 85 and 81 generate the proper bias conditions and also act as quiescent state stabilizers. The collector to base path composed by resistor 83 and capacitor 84 acts as a compensator for the overall feed back loop.

The three collector resistors 34, 64 and 86 are connected to a negative voltage supply at the terminal 33 through the filtering network composed by an inductor 160 and capacitor 161.

Feed back to stabilize the three amplifier stages is provided by the series-connected resistor 87 and capacitor 88.

The output of the third amplifier stage (transistor 48) is the output for the amplifier 13, FIG. 1, and is connected through a coupling capacitor 89 to an input winding of a phase-splitting transformer 90. A center-tapped secondary winding provides a direct connection over lead 91 and an inverted connection over lead 92 to a full wave rectifier composed of diodes 93 and 94.

The negative-going voltage waveforms emerging at the secondary terminals 91 and 92 are full-wave rectified by the diodes 93 and 94, and the output of the diodes 93 and 94 is taken below ground potential as determined by the resistor 95. This output is connected over a lead 96 to a peak detector 18, FIG. 1, which includes a capacitor 97 in series with a capacitor 98 connected, in turn, to the base terminal 99 of an amplifier transistor 100, as seen in FIG. 6, and including resistors 101 and 102 to ground.

Resistor 95 closes the conductive path to ground, and a resistor 119 develops a small voltage threshold level to exclude any noise that has gone through the full wave rectifier. The output of the latter is differentiated by means of the network containing capacitor 97 and resistor 101, in order to produce, finally, an output which is determined by the peak of the rectified waveforms over the lead 96.

The output of the differentiator network is fed by means of a coupling capacitor 98 to the transistor 100 which operates in the class A mode with a common emitter configuration. The collector resistor 106 acts as the D.-C. load, the emitter resistor 104 produces a negative voltage feed back and the two base resistors 110 and 102 generate the proper bias conditions and also act as quiescent state stabilizers.

The emitter terminal 103 of the transistor 100 is connected directly to ground through a resistor 104, and the collector terminal 105 is connected through a resistor 106 and a choke 107 to a potential source at a terminal 108. A capacitor 109 provides a coupling path to ground.

A resistor 110 is connected between the collector terminal 105 and the base terminal 99 of the transistor 100 to provide a feed back path and a base bias for this transistor. The output of the transistor 100 is coupled from the collector terminal 105 by a capacitor 111 to the base terminal 112 of a second amplifier transistor 113.

The base terminal 112 is connected through a resistor 114 to ground, and a resistor 115 provides a feed back path from the collector terminal 116 to the base terminal 112.

A resistor 117 connects the collector terminal 116 over a lead 118 to the terminal 108 at which a suitable voltage source is connected. A resistor 119 is connected between the signal input lead 96 to the collector terminals 105 and 116, respectively, through the resistors 106 and 117, respectively, to provide a noise clipping level. A capacitor 120 provides ground coupling.

The collector resistor 117 acts as the D.-C. load, the emitter resistor 162 provides a negative voltage feed back and the two base resistors, 115 and 114 generate the proper bias conditions and also act as quiescent state stabilizers.

The output of the second amplifier transistor 116 is taken by a lead 121 from the collector terminal 116 for coupling through a capacitor 122 and a resistor 123 to one output terminal 124. A connection 125 couples the capacitor 122 with the resistor 123, and a connection 126 through a diode 127 connects this same signal to a one-shot multivibrator circuit 20, FIG. 1, made up of transistors 128, 129 and 130.

Transistors 129 and 128 are the usual switching elements, with 129 in the absence of signal in the "OFF" state and with 128 in the "ON" state.

The diode 127 is connected directly to the base terminal 131 of the transistor 128 and, through a coupling capacitor 132, to the emitter terminal 133 of the transistor 130. The emitter terminal 134 of the transistor 128 is connected through to ground, as is the emitter terminal 135 of the transistor 129. The emitter terminal 123 of the transistor 130 is connected through ground through a resistor 136. Also, the capacitor 132 serves as the timing element by its discharge time.

The collector terminal 137 of the transistor 128 is connected through a resistor 138 to the collector terminal 139 of the transistor 130 and, through a resistor 140 to the collector terminal 141 of the transistor 129. A capacitor 142 provides ground coupling for this path, and the resistors 138 and 140 supply direct current loads.

The collector terminal 141 of the transistor 129 is connected through to the base terminal 143 of the transistor 130 and also provides over leads 144 and 145, a connection to the other output terminal 146.

The collector terminal 137 of the transistor 128 while providing over a lead 147 a connection to the first output terminal 124, also is connected through a resistor 148 to the base terminal 149 of the transistor 129. The resistor 148 is shunted by a capacitor 150. The divider network composed by resistors 148 and 151, together with compensating capacitor 150, biases transistors 129 in the "OFF" state.

A suitable source of voltage is applied to the base terminal 149 of the transistor 129 through a resistor 151, and a negative voltage source is applied through a choke 152 directly to the collector terminal 139 of the transistor 130. A resistor 153 is connected from the choke 152 to the base terminal 131 of the transistor 128 to bias this transistor 128 in the "ON" state.

A dode 154 is connected between the base terminal 143 and the emitter terminal 133 of the transistor 130, and a diode 155 is connected between the output lead 147 and a set of clamping diodes 156, 157 and 158. A fast discharge diode 159 is connected at the output lead 121 from the amplifier transistor 113.

Diode 127 and resistor 123, the first connected to the base of transistor 128 and the other to its collector, serve as the triggering network. Diode 159, connected to ground, acts as a fast discharge element aiding capacitor 122 to recover. Diodes 156 and 155 limit the negative excursions of the collectors 141 and 137, respectively, by clamping their voltage to the zener-type diode 157.

Transistor 130 operates as an emitter-follower having its emitter connected through the resistor 136 to ground.

Diode 154 serves as a by-pass path in the case where the emitter-follower turns "OFF." The purpose of the emitter-follower is to transform the value of resistor 140 into a considerably lower one and so charge more rapidly capacitor 132. The overall effect is thus to increase very considerably the duty factor of the monostable multivibrator. Resistors 140, 138 and the collector of transistor 130 are connected to a negative voltage supply 164 through the filtering network composed by the inductor 152 and the capacitor 142.

It will be seen now that the signals derived from the magnetostrictive delay line were integrated, inverted and the forward and inverted signals were combined in the full wave rectification to provide unidirectional and constant amplitude output signals. These output signals are utilized readily in circuits such as peak detection circuits and generally will be compatible with magnetic tape derived signals and other signals encountered in computer systems.

With the circuit of the invention, the operation of the delay line is simplified because less complicated circuits can be used. Moreover, since the output becomes substantially identical to that of a magnetic tape through a proper voltage differentiating transducer, the same amplifiers used now in the industry to "read" digitally can be used.

Obviously, various modifications can be made without departing from the invention. Therefore, the scope of the invention is defined by the scope of the claims appended hereto.

What is claimed is:

1. A system for converting NRZ code signals from a magnetostrictive source into unidirectional signals of constant amplitude, comprising,
    a magnetostrictive source, an integrator circuit including connection means to receive input signals from said magnetostrictive source,
    amplifier circuit means connected to amplify signals from said integrator circuit, and
    circuit means connected to receive the output from said amplifier circuit means to provide full wave rectification of the amplified signals.

2. A system for converting signals from a magnetostrictive source into unidirectional signals of constant amplitude, comprising,
    a magnetostrictive source, an integrator circuit including connector means to receive input signals from said magnetostrictive source,
    amplifier circuit means connected to amplify signals from said integrator circuit,
    full wave rectification circuit means adapted to provide full wave rectification, and
    circuit means connected between the output of said amplifier circuit means and the input to said rectifier circuit means to invert the signal from said amplifier circuit means applied to one portion of said full wave rectifier circuit means.

3. A system for converting signals from a magnetostrictive source into unidirectional signals of constant amplitude, comprising,
    a magnetostrictive source, an integrator circuit including connection means to receive input signals from said magnetostrictive source and including at least one transistor with a second transistor connected thereto as an emitter follower,
    amplifier circuit means connected to said emitter follower transistor to amplify signals from said integrator circuit, and
    circuit means connected to receive the output from said amplifier circuit means to provide full wave rectification of the amplified signals.

4. A system for converting signals from a magnetostrictive source into unidirectional signals of constant amplitude, comprising,
    a magnetostrictive source, an integrator circuit including connection means to receive input signals from said magnetostrictive source, amplifier circuit means connected to amplify signals from said integrator circuit, circuit means connected to receive the output from said amplifier circuit means to provide full wave rectification of the amplified signals, peak detector circuit means connected to receive the output from said full wave circuit means, and a multivibrator circuit means connected to receive the output from said peak detector circuit means and including output terminal means.

5. A system for converting signals from a magnetostrictive source into unidirectional signals of constant amplitude, comprising, a magnetostrictive source, an integrator circuit including connection means to receive input signals from said magnetostrictive source, amplifier circuit means connected to amplify signals from said integrator circuit, circuit means adapted to provide full wave rectification, and coupling circuit means connected between said amplifier circuit means and said circuit means adapted to provide full wave rectification including a transformer to provide a source of inverted signals.

6. A system for converting NRZ code signals from a magnetostrictive source into unidirectional signals of constant amplitude, comprising, a magnetostrictive source, an integrator circuit including connection means to receive input signals from said magnetostrictive source, said integrator circuit including at least one transistor and a second transistor connected as an emitter follower, amplifier circuit means including a predetermined number of transistors connected in successive stages to amplify signals from said integrator circuit, circuit means adapted to provide full wave rectification, and a coupling circuit including inverter means connected between said amplifier circuit means and said full wave rectifier circuit means.

References Cited by the Examiner
UNITED STATES PATENTS

| | | | |
|---|---|---|---|
| 2,587,426 | 2/52 | Aiken | 328—138 |
| 2,974,237 | 3/61 | Ehret | 307—88.5 |
| 2,999,155 | 9/61 | Masonson | 329—192 XR |
| 3,007,143 | 10/61 | Hagopian | 328—127 XR |

ARTHUR GAUSS, *Primary Examiner.*

JOHN W. HUCKERT, *Examiner.*